United States Patent
Choi et al.

(10) Patent No.: US 9,143,759 B2
(45) Date of Patent: Sep. 22, 2015

(54) INTELLIGENT IMAGE SURVEILLANCE SYSTEM USING NETWORK CAMERA AND METHOD THEREFOR

(75) Inventors: Sung Hoon Choi, Seoul (KR); Sang Jean Lee, Incheon (KR)

(73) Assignee: LG CNS CO., LTD., Seoul (KR)

( * ) Notice: Subject to any disclaimer, the term of this patent is extended or adjusted under 35 U.S.C. 154(b) by 648 days.

(21) Appl. No.: 13/478,793

(22) Filed: May 23, 2012

(65) Prior Publication Data

US 2013/0141543 A1  Jun. 6, 2013

(30) Foreign Application Priority Data

May 26, 2011  (KR) .......................... 10-2011-0049971

(51) Int. Cl.
| | | |
|---|---|---|
| *H04N 13/02* | (2006.01) | |
| *G06T 15/00* | (2011.01) | |
| *H04N 7/18* | (2006.01) | |
| *G08B 13/196* | (2006.01) | |

(52) U.S. Cl.
CPC ............ *H04N 13/0203* (2013.01); *G06T 15/00* (2013.01); *G08B 13/19641* (2013.01); *G08B 13/19667* (2013.01); *G08B 13/19671* (2013.01); *G08B 13/19691* (2013.01); *H04N 7/181* (2013.01)

(58) Field of Classification Search
None
See application file for complete search history.

(56) References Cited

U.S. PATENT DOCUMENTS

| | | | | |
|---|---|---|---|---|
| 7,680,192 B2 * | 3/2010 | Kaplinsky | .................. | 375/240.2 |
| 8,477,227 B2 * | 7/2013 | Hio | .......................... | 348/333.01 |
| 2003/0048671 A1 * | 3/2003 | Yoshikawa et al. | ........... | 365/200 |
| 2003/0085992 A1 * | 5/2003 | Arpa et al. | ....................... | 348/47 |
| 2004/0002049 A1 * | 1/2004 | Beavers et al. | ................ | 434/350 |
| 2004/0119990 A1 * | 6/2004 | Miller et al. | .................... | 358/1.2 |
| 2005/0144296 A1 * | 6/2005 | Monroe et al. | ................ | 709/228 |
| 2006/0280496 A1 * | 12/2006 | Tanoue | ......................... | 396/287 |
| 2007/0107029 A1 * | 5/2007 | Monroe et al. | ................ | 725/105 |

FOREIGN PATENT DOCUMENTS

| | | |
|---|---|---|
| KR | 10-20100110658 | 5/2011 |
| WO | 02/39716 A2 | 5/2002 |
| WO | 2005120071 A2 | 12/2005 |

* cited by examiner

*Primary Examiner* — Sath V Perungavoor
*Assistant Examiner* — Janese Duley
(74) *Attorney, Agent, or Firm* — Madeline F. Schiesser; Keohane & D'Alessandro, PLLC

(57) ABSTRACT

An intelligent control system according to an exemplary embodiment of the present disclosure includes a plurality of network cameras to photograph a surveillance area; an image gate unit to perform image processing of image data, which is input from the plurality of network cameras, according to a specification that is requested by a user; a smart image providing unit to convert a plurality of image streams, which are image processed by the image gate unit, to a single image stream; and an image display unit to generate a three-dimensional (3D) image by segmenting, into a plurality of images, the single image stream that is input from the smart image providing unit and by disposing the segmented images on corresponding positions on a 3D modeling.

19 Claims, 8 Drawing Sheets

300

(1): INTRUDER DETECTION  (2): OBJECT TRACING  (3): MISSING OBJECT DETECTION  (4): ROBBERY DETECTION (5): LOITERER DETECTION  (6): TRAFFIC COEFFICIENT  (7): FORBIDDEN DIRECTION DETECTION  (8): DANGEROUS AREA DETECTION

INTELLIGENT IMAGE SURVEILLANCE SYSTEM USING NETWORK CAMERA AND METHOD THEREFOR

CROSS-REFERENCE TO RELATED APPLICATIONS

This application is based on and claims priority under 35 U.S.C. §119(a) from Korean Patent Application No. 10-2011-49971, filed on May 26, 2011, with the Korean Intellectual Property Office, the disclosure of which is incorporated herein in its entirety by reference.

TECHNICAL FIELD

The present disclosure relates to an image surveillance system, and more particularly, to an intelligent image surveillance system using a network camera.

BACKGROUND

Since industrialization, image surveillance systems, which detect the occurrence of a predetermined act or accident, have long been in use. The importance of image surveillance systems continues to increase.

In the modern society, as characteristics of informatization, unmanned systems, automation, and computerization increase, the individual stability and the stability in a place of business continuously appear as important issues. Therefore, efforts for protecting and managing properties and the safety of individuals and the place of business have been made. The importance and range of security has been widened to major facilities, public offices, schools, companies, and homes. Under this trend of the times, an image surveillance system based on light sense, which is major sense of humans, is necessarily needed in almost every system.

A representative example of an image surveillance system includes a control (or surveillance) system using a network camera (CCTV). The CCTV control system is rapidly evolving together with development in image input technology, image transmission technology, and image output technology.

The current CCTV control system outputs images, input from a plurality of cameras, on a plurality of monitors that are disposed within a control center, or disposes and thereby outputs a plurality of lattice-shaped images on a single monitor. Then, an operator or a manager performs a surveillance activity while observing images output on the monitor.

However, the number of network cameras used for the control system is increasing and, therefore, an amount of image data input into the control system is also increasing. Such an increase in image data acts as a transmission load in a network, thereby degrading the quality of images. For example, when the number of network cameras displaying which VGA (640*480, 32 bits color) images is greater than 60, all of the images are not output on the screen at one time and are output using a method of circulating the whole images, and a resolution of output images lowers and it doesn't make monitoring performance well.

With a large number of network cameras, it is difficult to know where images displayed on a monitor are located. And thus, an understanding of an image is reduced. Accordingly, there is a desire for developing an intelligent control system for rapid processing of increasing image data and efficient surveillance by a user.

SUMMARY

The present disclosure has been made in an effort to provide an intelligent control system that displays three-dimensional (3D) modeling data in a single screen and outputs multi-channel image in 3D modeling space by applying a 3D rendering technology to images input from a plurality of network cameras.

The present disclosure has been made in an effort to provide an intelligent control system that provides the optimal image quality without increasing a network load by adjusting a resolution of an image displayed automatically according to change of a viewpoint of a user.

The present disclosure has been made in an effort to provide an intelligent control system that supplies an image of a resolution adjusted for each request in real time when a plurality of users with a camera present in a network request an image stream of respectively different resolution.

The present disclosure has been made in an effort to provide an intelligent control system that optimizes a rendering rate of a 3D image by reducing use of iterative image resources and a use of unnecessary overhead using an image integration streaming service.

The present disclosure has been made in an effort to provide an intelligent control system that transfers a final output screen to a plurality of senior supervisors using a multi-streaming service.

The present disclosure has been made in an effort to provide an intelligent control system that minimizes a communication traffic using compressed image data between lower systems.

An exemplary embodiment of the present disclosure provides an intelligent control system, including: a plurality of network cameras to photograph a surveillance area; an image gate unit to perform image processing of image data, which is input from the plurality of network cameras, according to a specification that is requested by a user; a smart image providing unit to convert a plurality of image streams, which is image processed by the image gate unit, to a single image stream; and an image display unit to generate a 3D image by segmenting, into a plurality of images, the single image stream that is input from the smart image providing unit and by disposing the segmented images on corresponding positions on a 3D modeling.

Another exemplary embodiment of the present disclosure provides an intelligent control method, including: receiving, from a plurality of network cameras, image data in which a surveillance area is photographed; performing image processing of the received image data according to a specification that is requested by a user; converting the image processed plurality of image data to a single image stream to be displayed on a single screen; and generating a 3D image by segmenting the converted single image stream into a plurality of images, and by disposing the segmented images on corresponding positions of a 3D modeling.

According to the exemplary embodiments of the present disclosure, it is possible to naturally output a 3D image on a single screen by applying a 3D rendering technology to images input from a plurality of network cameras. It is possible to provide an environment that can be surveyed as if a user looks around a field at various angles and positions by manipulating a viewpoint as the user desires.

According to the exemplary embodiments of the present disclosure, it is possible to maintain the optimal image quality and to reduce a network load by adjusting a resolution of an image according to a change in a viewpoint of a user.

Meanwhile, other various effects may be disclosed directly or suggestively in the detailed description according to the following exemplary embodiments of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
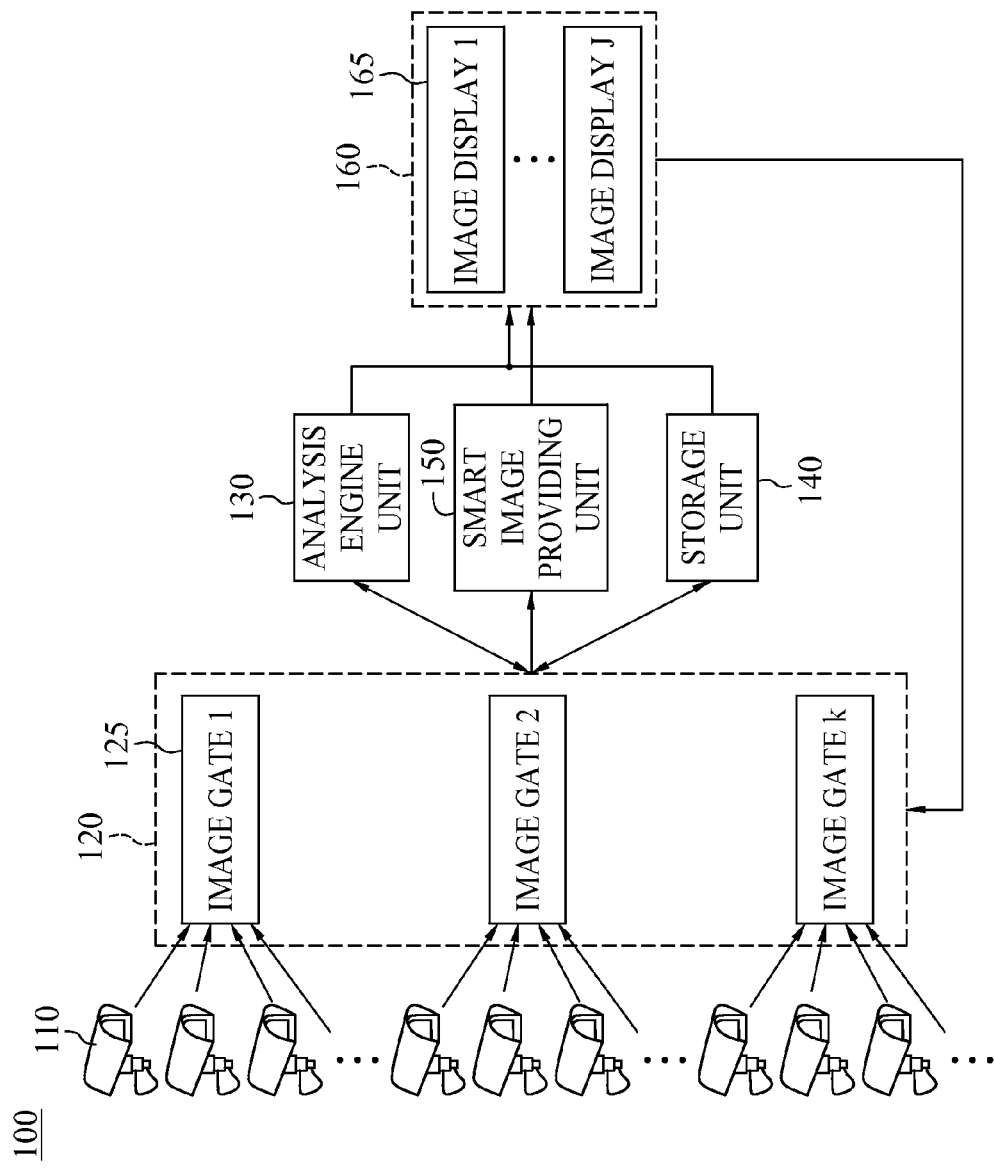
FIG. 1 is a block diagram illustrating a configuration of an intelligent control system based on a network camera according to an exemplary embodiment of the present disclosure.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

This disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art. The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," or similar language means that a particular feature, structure, or characteristic described in connection with the embodiment is included in at least one embodiment of the present invention. Thus appearances of the phrases "in one embodiment," "in an embodiment," "in embodiments" and similar language throughout this specification may, but do not necessarily, all refer to the same embodiment.

When it is determined a detailed description related to a related known function or configuration may make the purpose of the present disclosure unnecessarily ambiguous in describing the present disclosure, the detailed description will be omitted here. Also, terms used herein are defined to appropriately describe the exemplary embodiments of the present disclosure and thus, may be changed depending on a user, the intent of an operator, or a custom. Accordingly, the terms must be defined based on the following overall description of this specification.

In general, a CCTV control system outputs, on a plurality of monitors, images that are input from a plurality of cameras installed in a surveillance area, or outputs the plurality of images on a single monitor by segmenting the plurality of images into a lattice shape. Being displayed in the form of lattice on 2D plane in this way, it is difficult for the human to recognize where the respective cameras are assigned to which area and the spatial correlation between them. And it is likely that an image displayed on 2D lattice plan has no relation with the next images placed near at the time of arrangement. It often happens that it is difficult to distinguish where some cameras are when images displayed from multiple cameras are similar. However, if these images are displayed for the 3D space, an operator may readily and intuitively understand a field circumstance because mutual correlation in a spatial aspect can be recognized at a glance and the locations on 3D space of similar images are clearly found.

Therefore, an exemplary embodiment of the present disclosure provides an intelligent control system that outputs many images that are input from a plurality of network cameras in 3D modeling space on a single screen by applying a 3D rendering technology to display video in real time in 3D space.

Hereinafter, exemplary embodiments of the present disclosure will be described with reference to the accompanying drawings.

FIG. 1 is a block diagram illustrating a configuration of an intelligent control system 100 based on a network camera according to an exemplary embodiment of the present disclosure.

Referring to FIG. 1, the control system 100 includes a plurality of network cameras 110, an image gate unit 120, an analysis engine unit 130, a smart image providing unit 150, a storage unit 140, and an image display unit 160. The control system 100 may further include a user providing unit (not shown) and a senior supervisor providing unit (not shown). Hereinafter, the exemplary embodiment of the present disclosure will be described assuming that a total number of network cameras present within the control system 100 is N.

The network camera 110 is installed in a surveillance target area to monitor a position and a motion of a pedestrian and an object, and the like.

The network camera 110 generates a compressed image frame by converting, to a digital image signal, an analog image signal that is input via a lens, and by encoding the converted digital image signal. Here, the network camera 110 may use H.264, MPEG4, MJPEG, and the like as an image compression technology, which is not restricted.

The network camera 110 provides the image gate unit 120 with the image frame input in real time, over a wired or wireless network. An Internet protocol (IP) network, a local area network (LAN), or the like, may be used as the wired network used by the control system 100, which is not restricted. A mobile communication network, a wireless broadband Internet (WiBro) network, a wireless LAN, or the like, may be used as the wireless network used by the control system 100, which is not restricted. The use of the wired/wireless network enables a distance constraint in an existing analog based system to be overcome.

The image gate unit 120 functions to process images input from the network cameras 110, and to transfer the processed images to the analysis engine unit 130, the smart image providing unit 150, the storage unit 140, and the user providing unit.

The image gate unit 120 functions to perform streaming of camera images to be expressed on a screen to be viewed by a user, as requested by the image display unit 160, and to transfer the camera images to the smart image providing unit 150. That is, the image gate unit 120 transfers input images to the smart image providing unit 150 by adjusting a resolution of the input images according to a change in a viewpoint of the user.

The image gate unit 120 includes a plurality of image gates 125. Each of the image gates 125 processes image data that is input from a predetermined network camera group.

For example, all of the network cameras 110 may be divided into a plurality of groups based on the number of image gates 125. A plurality of network cameras belonging to each group may be connected to each image gate 125 (e.g., Image Gate 1, Image Gate 2, Image Gate k, etc.).

The network cameras 110 may be divided into a plurality of groups based on installed positions. The plurality of network cameras 110 belonging to each group may be connected to each image gate 125. Meanwhile, a method of dividing the network cameras 110 into the plurality of groups may employ another method instead of the aforementioned method, which is not restricted.

A configuration of the image gate 125 will be described in detail with reference to FIG. 2.

Figure 2:
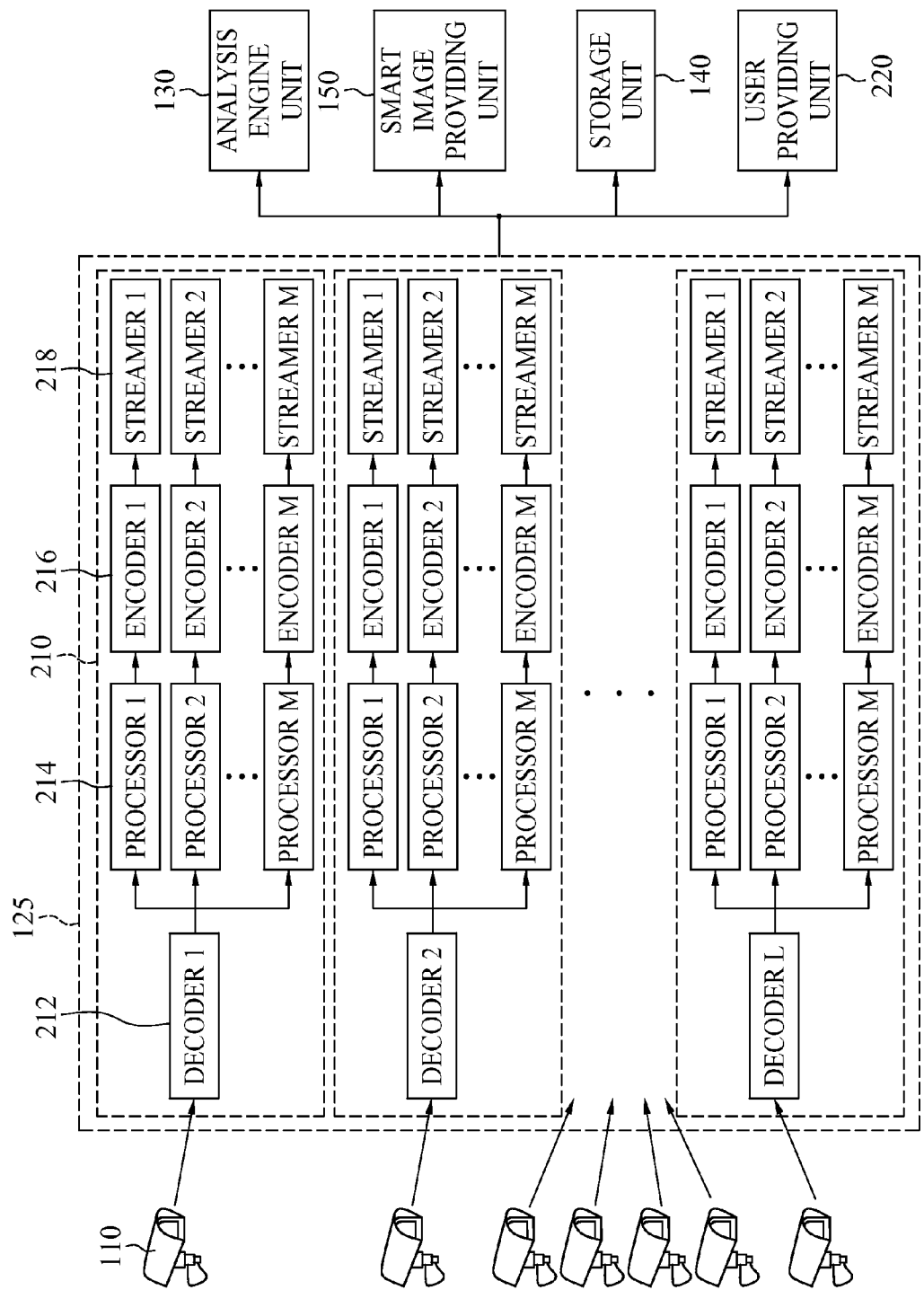
FIG. 2 is a block diagram illustrating a configuration of an image gate according to an exemplary embodiment of the present disclosure.

Referring to FIG. 2, the image gate 125 includes a plurality of image processors 210. The image processors 210 are connected one-to-one with the plurality of network cameras belonging to each group, respectively. Here, the number of the image processors 210 included in the image gate 125 may be determined appropriately based on a type of a network camera used in the corresponding control system 100, the processing capability of the image gate 125, and the like.

For example, the image gate 125 may process compressed image data from 48 cameras based on a video graphics array (VGA) camera. In this instance, 48 image processors 210 are required. The image gate 125 may process compressed image data from eight cameras based on a full high definition (HD) camera. In this instance, eight image processors 210 are required.

The image gate 125 may receive and process compressed image data from a camera that follows an open network video interface forum (ONVIF) standard.

The image processor 210 includes a single decoder 212, M processors 214, M encoders 216, and M streamers 218. Meanwhile, the plurality of streamers 218 are separately configured in the exemplary embodiment of the present disclosure, which is only an example and thus is not restricted. Accordingly, the plurality of streamers 218 may be configured within the plurality of encoders 216 instead of being separately configured.

The decoder 212 decodes image data, input from the network camera 110 in real time, according to a predetermined scheme, and provides the decoded image data to the plurality of processors 214.

The plurality of processors 214 processes image data according to a specification that is requested by a plurality of users or a specification that is requested by apparatuses 130, 140, and 150 of the corresponding control system 100 and then, outputs the processed image data to the plurality of encoders 216.

That is, the plurality of processors 214 perform different image processing according to a specification that is requested by a user, i.e., a resolution of an image, a frame rate, a compression quality, a compression format, and the like. For example, the plurality of processors 214 may perform image processing according to a resolution of an image that is adjusted to provide an optimal image according to a change in a viewpoint of the user. The image processed data as above is transferred to the smart image providing unit 150 or a user providing unit 220.

The plurality of processors 214 may perform image processing for providing raw image data and/or metadata to the analysis engine unit 130 and the storage unit 140 within the corresponding control system 100.

According to a user or system requirement, the image processor 210 includes the plurality of processors 214, the plurality of encoders 216, and the plurality of streamers 218. The exemplary embodiment of the present disclosure will be described based on that M apparatuses are configured as an example.

The plurality of encoders 216 compress image data, output from the plurality of processors 214, according to a predetermined encoding scheme, and then transfer the compressed image data to the plurality of streamers 218.

The plurality of streamers 218 perform streaming of the encoded image data based on a predetermined transport protocol, and thereby provides a multi-media streaming service.

The streaming is a technology capable of playing back an audio, a moving picture, and the like in real time, not downloading the same, and reduces transmission time of large multimedia data according to a data compression and encoding technology, thereby transmitting the reduced multimedia data to a user.

The multimedia streaming service refers to a service of encoding multimedia content such as an audio, a video, and the like provided from a content provider, to a format suitable for transmission over a network, thereby transmitting the encoded multimedia content to the user in real time through a streaming server. The multimedia streaming service uses, as a transport protocol for real-time streaming, a real-time streaming protocol (hereinafter, referred to as an 'RTSP'), a real-time transport protocol (hereinafter, referred to as an 'RTP'), and a real-time transport control protocol (hereinafter, referred to as an 'TCP').

The plurality of image processors 210 may use, as the image compression technology, H.264, MPEG 4, MJPEG, and the like, which is not restricted.

Image data that is finally output from the image processors 210 is provided to each of the analysis engine unit 130, the smart image providing unit 150, and the storage unit 140. Here, image data provided to the analysis engine unit 130 is raw image data, and image data provided to the storage unit 140 is raw image data and metadata. Meanwhile, image data input to the smart image providing unit 150 is data that is image processed according to a specification that is requested by an operator.

The plurality of image processors 210 may provide output image data to the user providing unit 220.

For example, when a plurality of users present in a network desire to view image data about a predetermined channel, the user providing unit 220 requests the image processor 210 that processes the image data of the predetermined channel for corresponding image data. Here, the predetermined channel is used to indicate a predetermined camera. In response to the request, the image processor 210 transfers the image processed data to the user providing unit 220 according to a specification that is requested by the plurality of users.

Referring again to FIG. 1, the analysis engine unit 130 functions to analyze image data input from the image gate unit 120, and to provide the analysis result so that alarm or event processing may be performed based on the analysis result.

Figure 3:
FIG. 3 illustrates an example of image detection types performed by an analysis engine unit according to an exemplary embodiment of the present disclosure.
Figure 3:
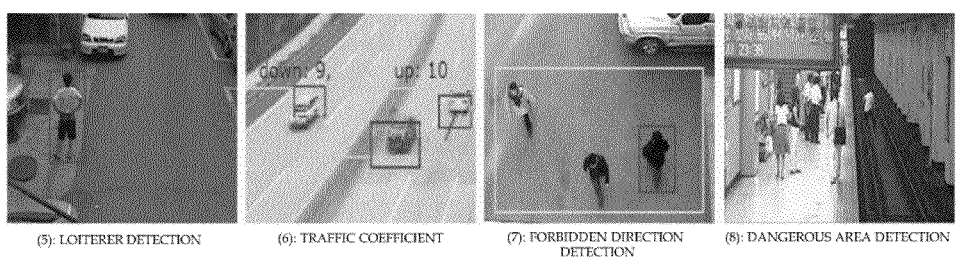

For example, referring to FIGS. 2 and 3, the analysis engine unit 130 analyzes the input image to thereby perform any number of detection conditions 300, including intruder detection (1), object tracing (2), missing object detection (3), robbery detection (4), loiterer detection (5), a traffic coefficient (6), forbidden direction detection (7), dangerous area detection (8), and the like. Here, the analysis engine unit 130 may analyze input image data using a detection algorithm and a tracing algorithm such as an optical flow, a background reduction scheme, and the like.

The analysis engine unit 130 may primarily analyze the input image data and perform a rule based operation based on the analysis result. For example, the analysis engine unit 130 may generate a new detection result by applying a user defined rule to the primary detection result, and may output countermeasures corresponding to the generated new detection result and the like.

The analysis engine unit 130 provides the analysis result of the input image data to the image display unit 160 and the storage unit 140. Next, when the analysis result satisfies a predetermined condition, the image display unit 160 may perform an event operation according to the corresponding condition. For example, in a case where an alarm is set to be broadcast if an intruder is detected, when the input image analysis result satisfies an intruder detection condition, the image display unit 160 broadcasts the alarm to thereby inform the user that the intruder is detected.

The storage unit 140 stores raw image data and metadata that are input from the image gate unit 120. The storage unit 140 stores the analysis result input from the analysis engine unit 130. Here, the metadata stored in the storage unit 140 indicates additional information such as a serial number of a camera, installation information of the camera, a photographed time, and the like.

The storage unit 140 operates based on a network, and may include large capacity storage media such as an optical disk, a magnetic disk, and a hard disk drive (HDD), low capacity storage media such as a read-only memory (ROM), a random access memory (RAM), a flash memory, a memory card, and the like, and/or other storage apparatuses.

An image data flow between the storage unit 140 and peripheral devices will be briefly described with reference to FIG. 4.

Figure 4:
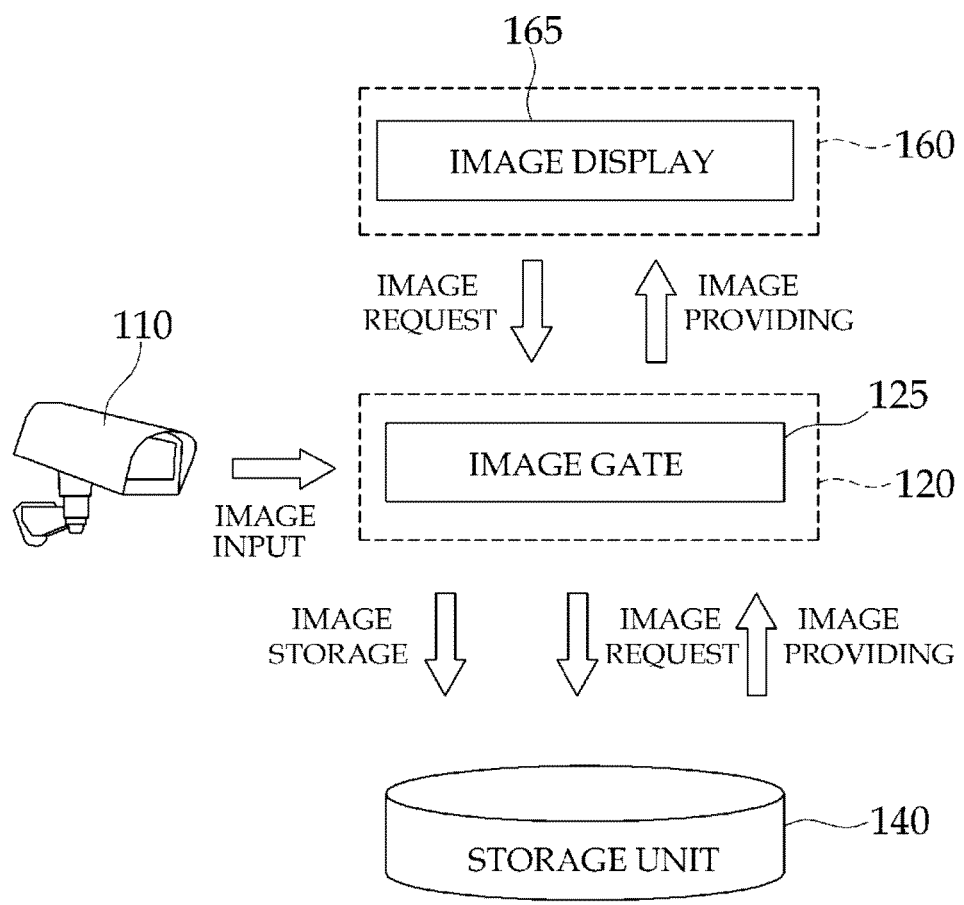
FIG. 4 is a diagram illustrating an image data flow between a storage unit and peripheral devices thereof according to an exemplary embodiment of the present disclosure.

Referring to FIG. 4, when the plurality of network cameras 110 provide photographed image data to the image gate unit 120, the image gate unit 120 generates raw image data and metadata using the input image data. Next, the image gate unit 120 stores the raw image data and the metadata in the storage unit 140.

Meanwhile, when the user requests the stored image data, the image display unit 160 transfers a request message to the image gate unit 120. Next, the image gate unit 120 transfers the received request message to the storage unit 140 to thereby request corresponding image data.

The storage unit 140 searches for the image data requested by the user, and provides the image data to the image gate unit 120. Next, the image gate unit 120 performs image processing of the input image data to a format that is requested by the user and then transfers the processed image data to the image display unit 160. In this instance, the image gate unit 120 transfers the processed image data to the image display unit 160 through the smart image providing unit 150.

Referring again to FIG. 1, the smart image providing unit 150 functions to process image data input from the image gate unit 120, and to thereby convert the processed image data to an optimal condition for configuring a 3D image.

That is, the smart image providing unit 150 combines a plurality of input image streams into a single image stream and provides the combined single image stream to the image display unit 160. As a result, since a decoding load with respect to images to be expressed on a screen decreases, the image display unit 160 may configure images of more channels as the 3D image. The image display unit 160 may optimize a 3D rendering rate by reducing a use of iterative image resource and a use of unnecessary overhead with respect to images to be expressed on the screen.

The smart image providing unit 150 is an apparatus to perform decoding and encoding with respect to a large number of images input from the image gate unit 120, and configures screens requested by the user and then provides the configured screens to the image display unit 160.

That is, in response to a user request, when the image gate unit 120 performs streaming of CCTV images to be displayed on the screen and thereby transfers the streamed CCTV images, the smart image providing unit 150 decodes the received image streams.

The smart image providing unit 150 configures a single screen by selecting, from among the decoded image streams, image streams that constitute a screen requested by the user, and by appropriately allocating the selected image streams according to a resolution.

Next, the smart image providing unit 150 encodes image data that is configured as a single screen, generates the encoded image data into a single image stream, and thereby provides the generated image stream to the image display unit 160.

A configuration of the smart image providing unit 150 will be described in detail with reference to FIG. 5.

Figure 5:
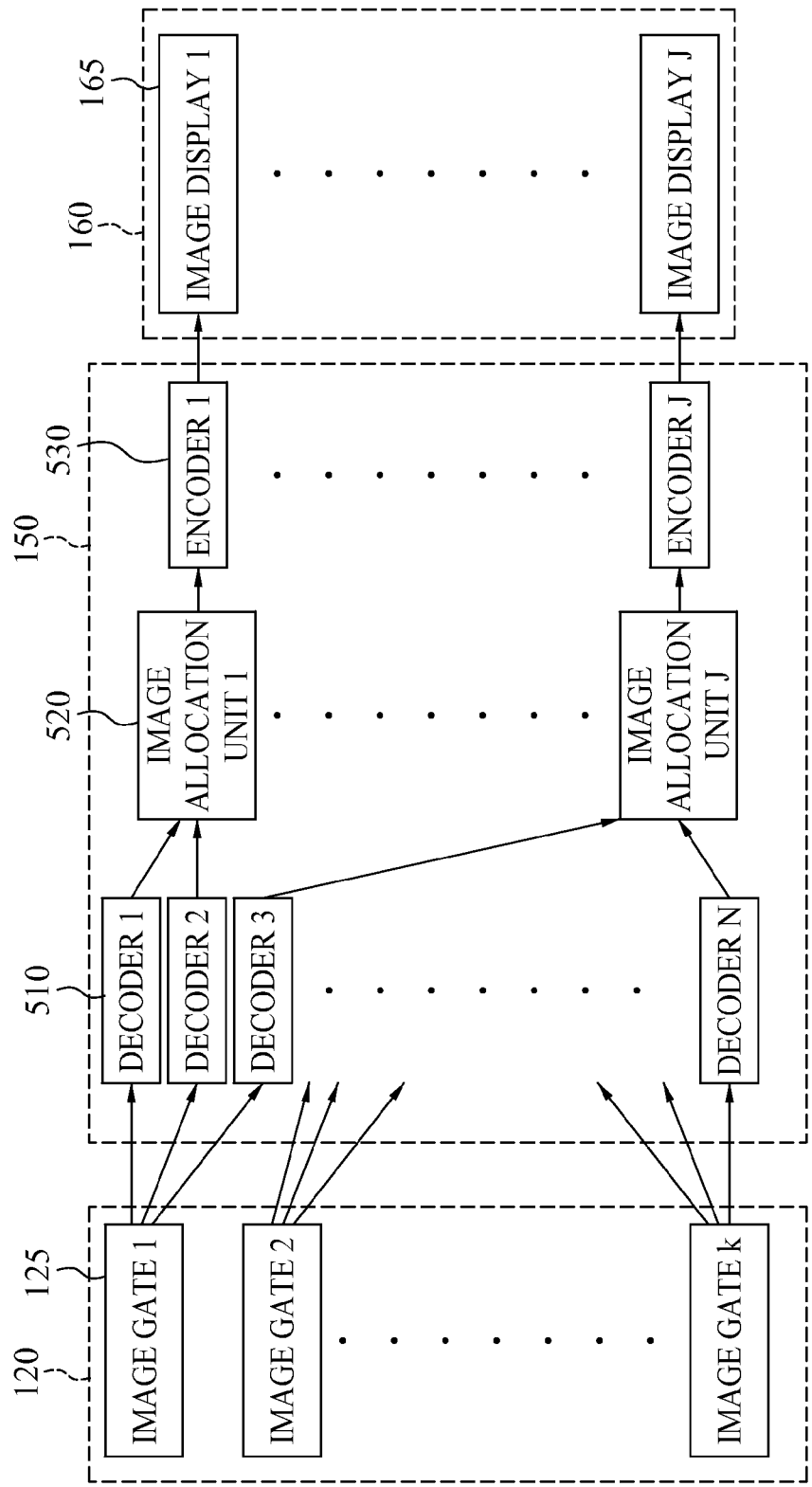
FIG. 5 is a block diagram illustrating a configuration of a smart image providing unit according to an exemplary embodiment of the present disclosure.

Referring to FIG. 5, the smart image providing unit 150 includes N decoders 510, J image allocation units 520, and J encoders 530. Here, the encoder 530 includes a streamer (not shown) for performing an image streaming operation. Meanwhile, in the exemplary embodiment of the present disclosure, the streamer is included in the encoder 530, which is only an example and thus, is not restricted.

The decoder 510 decodes image data, input from the image gate unit 120, according to a predetermined scheme, and provides the decoded image data to the image allocation unit 520.

A total number of decoders 510 included in the smart image providing unit 150 is identical to a total number (N) of network cameras 110 present within the control system 100. Accordingly, a single decoder decodes image data input from a single network camera.

The image allocation unit 520 receives, from the corresponding decoders 510, images that constitute the screen to be output through the image display unit 160. The image allocation unit 520 allocates, as different sizes of images, a plurality of images that are input from the corresponding decoders 510 and disposes the allocated images on the single screen.

The image allocation unit 520 generates image segmentation information by allocating the plurality of images as a suitable size according to a resolution of each image, based on each frame unit. Next, the image allocation unit 520 provides the encoder 530 with the image segmentation information and images input from the corresponding decoders 510.

Figure 6A:
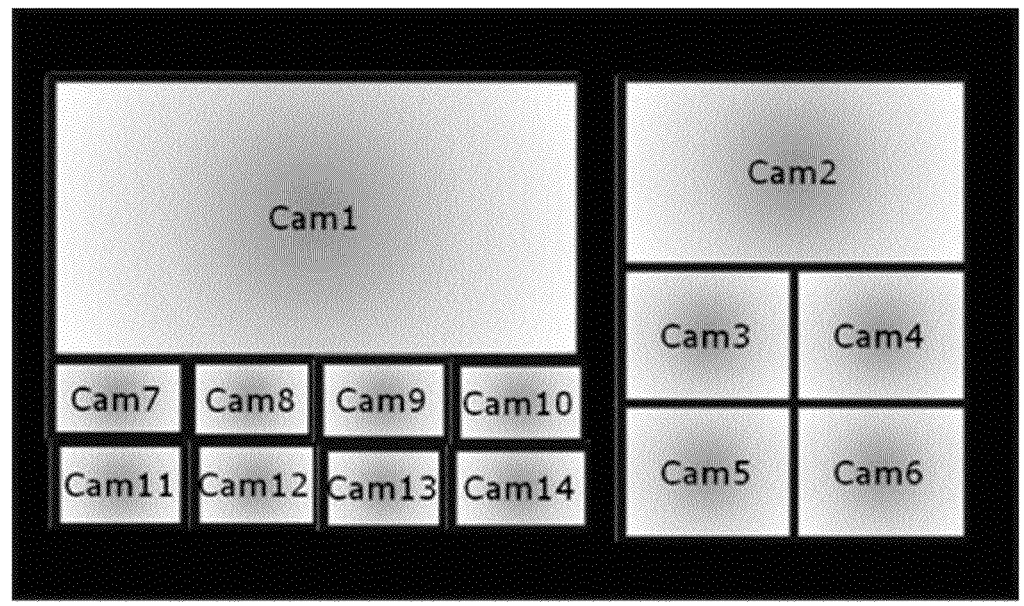
FIGS. 6A and 6B are diagrams illustrating an example of a screen that is configured by allocating, by image allocation units, a plurality of images as different sizes of images according to an exemplary embodiment of the present disclosure.
Figure 6B:
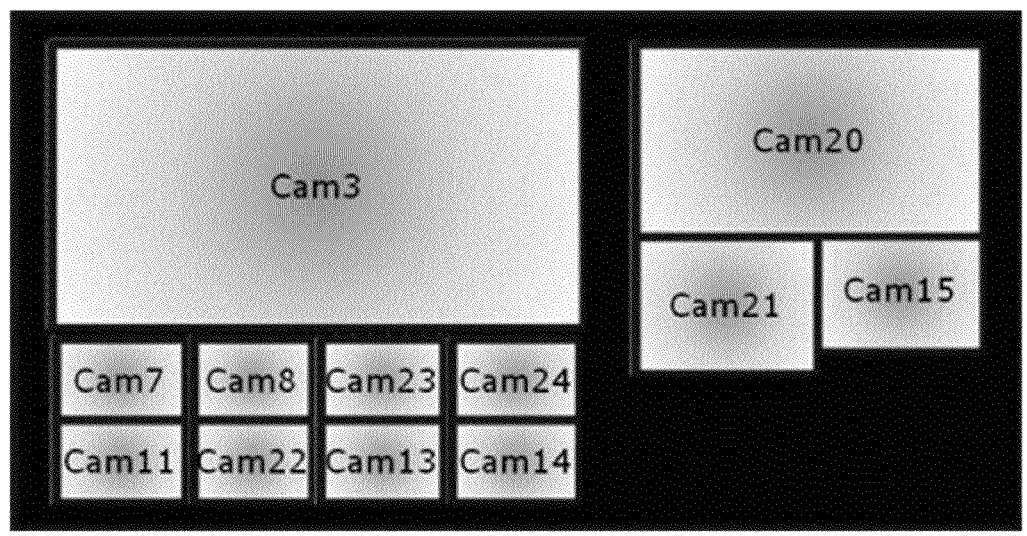

For example, FIGS. 6A and 6B are diagrams illustrating an example of a screen that is configured by allocating, by a first image allocation unit and a last image allocation unit (FIG. 5), a plurality of images, input from a plurality of decoders, as different sizes of images.

Referring to FIGS. 5 and 6A, the first image allocation unit 520 (e.g., Image Allocation Unit 1) receives images, input from camera 1 to camera 14, through a first decoder to a fourteenth decoder in real time. Next, the first image allocation unit 520 configures a single screen by disposing the input images as a suitable size according to a resolution of each image. Here, the resolution of each image is adjusted by the image gate unit 120 according to a user requirement and then, the resolution of each image is provided to the first image allocation unit 520.

The first image allocation unit 520 disposes an image, input from camera 1, on a left upper end of the screen to have a largest size and disposes an image, input from camera 2, on a right upper end of the screen to have a second largest size. Next, the first image allocation unit 520 disposes images of camera 3 to camera 6 below the image of camera 2 to have the same size, and disposes images of camera 7 to camera 14 below the image of camera 1 to have the same size.

Referring to FIGS. 5 and 6B, the last image allocation unit 520 (e.g., Image Allocation Unit J) receives images, input from cameras 3, 7, 8, 11, 13, 14, 15, 20, 21, 22, 23, and 24 in real time, through the plurality of decoders 510. Next, the last image allocation unit 520 configures the screen by disposing the input images as a suitable size according to a resolution of each image.

That is, the last image allocation unit 520 disposes an image, input from camera 3, on a left upper end of the screen to have a largest size and disposes an image, input from camera 20, on a right upper end of the screen to have a second largest size. Next, the last image allocation unit 520 dispose images of camera 21 and camera 15 below the image of camera 20 to have different sizes, and disposes images of cameras 7, 8, 11, 13, 14, 22, 23, and 24 below the image of camera 3 to have the same size.

The encoder 530 compresses the images, input from the image allocation unit 520, according to a predetermined encoding scheme and then performs image integration streaming. That is, the encoder 530 generates, into a single image stream, a plurality of image streams that are input from the plurality of decoders 510 and provides the generated single image stream to the image display unit 160. As a result, the image display unit 160 may optimize a rendering rate of a 3D image by reducing a use of iterative image resources and a use of unnecessary overhead for configuring the 3D image.

The encoder 530 transfers, to the image display unit 160, segmentation information that is input from the image allocation unit 520.

Meanwhile, each of the number of image allocation units 520 and the number of encoders 530 that are included in the smart image providing unit 150 may be configured to be the same as the number of image displays 165 that are included in the image display unit 160.

For example, when the number of image displays 165 is '1', the smart image providing unit 150 includes a single image allocation unit 520 and a single encoder 530. When the number of image displays 165 is 'J', the smart image providing unit 150 includes J image allocation units 520 and J encoders 530. Therefore, the smart image providing unit 150 may provide an image integration service to the plurality of image displays 165 by performing a multi-streaming service through the plurality of encoders 530.

The smart image providing unit 150 may use, as the image compression 25 technology, H.264, MPEG 4, MJPEG, and the like, which is not restricted.

Referring again to FIG. 1, the image display unit 160 configures a 3D image on a single screen by applying a 3D rendering technology to images that are input from the smart image providing unit 150.

Configuration of the 3D image requires collecting images at a single place in order to process a large number of channels on a single screen. An amount of image data significantly increases according to an increase in the number of channels and thus, a network load occurs.

Therefore, the image display unit 160 may reduce a transmission rate by verifying an image channel unseen on a control screen. The image display unit 160 may maintain a network load to be less than or equal to a predetermined level at all times by calculating an area of an image seen on the screen and by requesting corresponding image data at a suitable resolution when receiving the corresponding image data. For the above operation, the image display unit 160 may request the image gate unit 120 for images that have different resolutions according to a current screen configuration.

The image display unit 160 may provide optimized images according to a screen that varies by enlarging, reducing, and rotating the screen that the user desires to view and thereby provide a 3D image in which a user may experience the enhanced sense of realism.

That is, the image display unit 160 calculates the number of images to be expressed on a screen that varies according to a change in a viewpoint of the user and a resolution of each image using a 3D projection image, and segments the corresponding images to be suitable for a dynamic view. The image display unit 160 may output each image to be suitable for a 3D space by expressing each image at an optimal position of each segmented image.

Meanwhile, the image display unit 160 includes J image displays 165. A configuration of the image display 165 will be described in detail with reference to FIG. 7.

Figure 7:
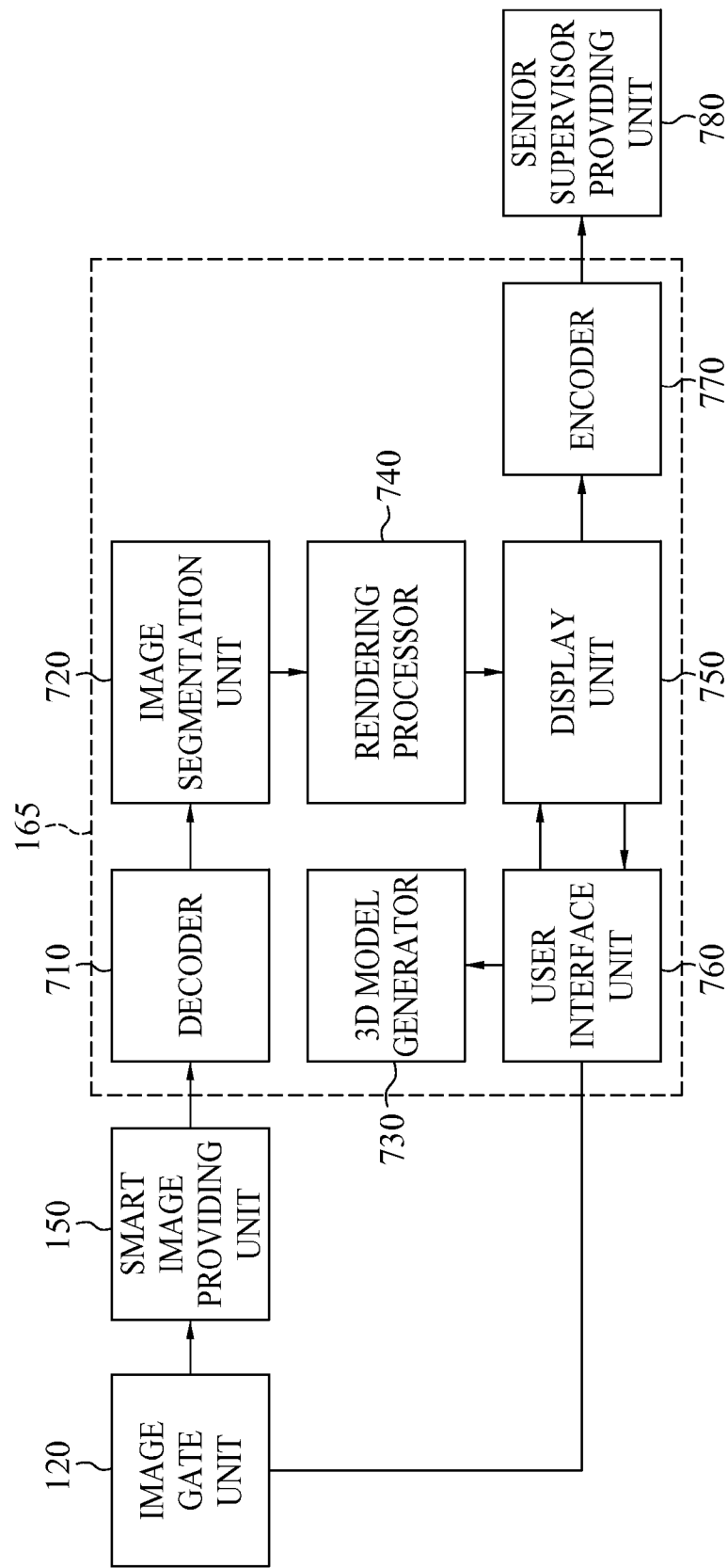
FIG. 7 is a block diagram illustrating a configuration of an image display according to an exemplary embodiment of the present disclosure.

Referring to FIG. 7, the image display 165 includes a decoder 710, an image segmentation unit 720, a 3D model generator 730, a rendering processor 740, a display unit 750, a user interface unit 760, and an encoder 770. Here, the display unit 750 and the user interface unit 760 may be configured as a single module. In the present exemplary embodiment, the user interface unit 760 and the encoder 770 are included within the image display unit 160, but this configuration is not limiting. That is, the user interface unit 760 and the encoder 770 may be separately installed outside the image display unit 160 and thereby be configured.

The image display 165 displays, on a single screen, images about a portion of channels requested by the user. Therefore, the plurality of image display 165 may provide a different plurality of screens according to a user request and necessity.

The decoder 710 decodes an image stream, input from the smart image providing unit 150, according to a predetermined scheme, and provides the decoded image data to the image segmentation unit 720.

The image segmentation unit 720 segments the decoded image data into a plurality of images using segmentation information that is received from the smart image providing unit 150. Next, the image segmentation unit 720 provides the segmented images to the rendering processor 740.

The 3D model generator 730 maps an image of a surveillance area to an image on a 3D space using a known 3D modeling technology. For example, the 3D model generator 730 may configure the image of the surveillance area as a 3D graphics image. However, the 3D graphics image is only an exemplary embodiment of the present disclosure and thus, is not restricted. That is, the image displayed by the 3D model generator 730 may be configured as an actual 3D image, not the 3D graphics image. Here, the 3D model generator 730 may pre-store an image of the overall surveillance area as a 3D image through mapping.

The 3D model generator 730 provides the rendering processor 740 with 3D modeling data (mapping data on a 3D space) about images that are input from the smart image providing unit 150. The 3D model generator 730 provides the rendering processor 740 with 3D modeling data about a place the user desires to observe through the user interface unit 760.

The rendering processor 740 generates the 3D image by disposing the images, input from the image segmentation unit 720, on corresponding positions of 3D space, and outputs the generated 3D image to the display unit 750.

That is, the rendering processor 740 may convert, to the 3D image, a plurality of images that are obtained by monitoring a corresponding area on 3D modeling and thereby express the converted 3D image on a single screen. Here, the rendering processor 740 may configure displaying image in the 3D space using a known 3D rendering technology.

The display unit 750 displays, on the screen, the 3D image that is input from the rendering processor 740. By providing of the 3D image, the user is able to accurately verify a situation through intuitive understanding about field circumstances and thereby quickly respond to the verified circumstance.

The display unit 750 transfers, to the user interface unit 760 and the encoder 770, the image that is displayed on the screen.

The user interface unit 760 may load and manipulate 3D modeling by controlling the 3D model generator 730 in response to a user request. The user interface unit 760 may control the display unit 750 to enlarge, reduce, or rotate the screen that the user desires to view.

In order to reflect, on a current screen, information such as addition, deletion, enlargement, reduction, movement, and the like of a CCTV image according to a change in a viewpoint of the user, the user interface unit 760 feeds back the above information to the image gate unit 120.

The user interface unit 760 calculates an optimal resolution according to sizes of images to be included in a corresponding screen by analyzing a newly updated screen, and provides the calculated optimal resolution to the image gate unit 120. Next, the image gate unit 120 performs image processing of the images that are input from the plurality of network cameras 110 according the respectively calculated optimal resolution, and transfers the processed images to the smart image providing unit 150. Through the above process, the control system 100 may maintain the optimal image quality and also reduce a network load by adjusting the resolution of the image according to the change in the viewpoint of the user.

The encoder 770 encodes 3D images displayed on the screen in real time and performs streaming of the encoded images and then transfers the streamed images to the senior supervisor providing unit 780. Next, the senior supervisor providing unit 780 may provide a senior supervisor in real time with the same image as the image expressed by the display unit 750. Accordingly, the senior supervisor may monitor control screens of subordinate managers in real time.

The encoder 770 may simultaneously provide a plurality of senior supervisors with the same image by performing multi-streaming of the 3D image displayed on the screen.

As described above, an intelligent control system according to an exemplary embodiment of the present disclosure may configure displaying 3D image on a single screen by applying a 3D rendering technology to images that are input from a plurality of network cameras.

The control system may provide an environment that can be surveyed as if a user looks around a field at various angles and positions by manipulating a viewpoint as the user desires, and may maintain the optimal image quality and also reduce a network load by adjusting a resolution of an image according to a change in the viewpoint of the user.

The control system may minimize communication traffic using compressed image data between lower systems.

Figure 8:
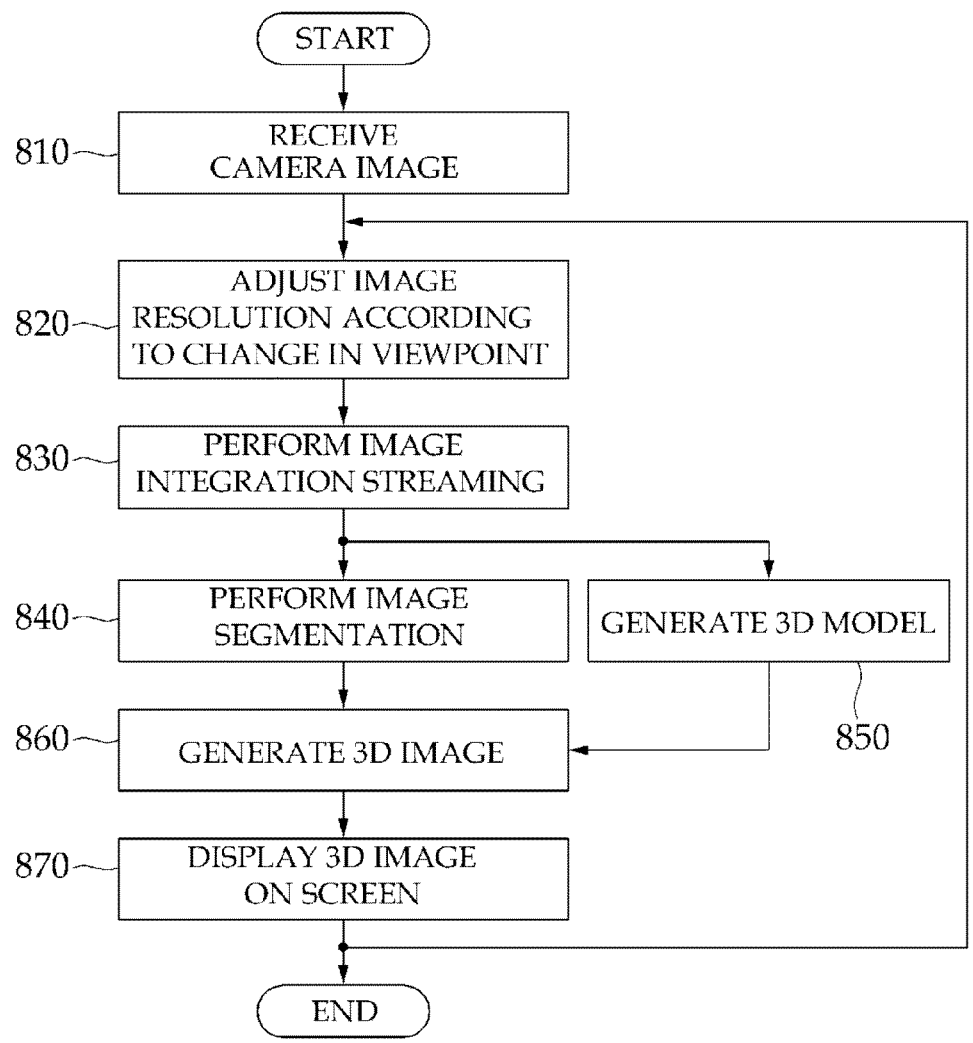
FIG. 8 is a flowchart illustrating an intelligent control method using a three-dimensional (3D) image according to an exemplary embodiment of the present disclosure.

FIG. 8 is a flowchart illustrating an intelligent control method using a 3D image according to an exemplary embodiment of the present disclosure.

Referring to FIG. 8, in operation 810, an image gate unit receives photographed images from a plurality of network cameras.

In operation 820, the image gate unit performs image processing of the received images according to a specification that is requested by a user. That is, the image gate unit performs image processing of adjusting a resolution of each image according to a change in a viewpoint of the user.

In operation 830, a smart image providing unit configures a single screen by selecting image streams requested by the user from among a plurality of image streams that are input from the image gate unit, and by allocating the selected image streams according to the resolution. Next, the smart image providing unit encodes image data configured as a single screen, generates the encoded image data as a single image stream and then provides the image stream to an image display unit.

In operation 840, the image display unit segments the single image stream into a plurality of images on the single screen using image segmentation information that is received from the smart image providing unit. In operation 850, the image display unit generates 3D modeling data about images that are input from the smart image providing unit. When operations 840 and 850 are completed, operation 860 is performed.

In operation 860, the image display unit generates a 3D image by disposing, on corresponding positions of the 3D modeling, the images that are segmented on the single screen.

Next, in operation 870, the image display unit displays the generated 3D image on the screen. By providing of the 3D image, the user is able to accurately verify a situation through intuitive understanding about field circumstances and thereby quickly respond to the verified circumstance.

When the user enlarges, reduces, or rotates the corresponding screen, or moves a viewpoint through the user interface unit on a screen that the user monitors or supervises, the aforementioned processes are repeated by moving to operation 820.

As described above, an intelligent control method according to an exemplary embodiment of the present disclosure may display 3D modeling data on a single screen by applying a 3D rendering technology and configure images that are input from a plurality of network cameras in the modeling space. The control method may maintain the optimal image quality and also reduce a network load by adjusting a resolution of an image that is input according to a change in a viewpoint of a user.

Furthermore, it can be appreciated that the approaches disclosed herein can be used within a computer system to display 3D modeling data on a single screen by applying a 3D rendering technology and configure images that are input from a plurality of network cameras in the modeling space. In this case, one or more computer systems for performing the processes described in the invention can be obtained and deployed to a computer infrastructure. To this extent, the deployment can comprise one or more of (1) installing program code on a computing device, such as a computer system, from a computer-readable storage device; (2) adding one or more computing devices to the infrastructure; and (3) incorporating and/or modifying one or more existing systems of the infrastructure to enable the infrastructure to perform the process actions of the invention.

For example, the flowchart of FIG. 8 illustrates the architecture, functionality, and operation of possible implementations of systems, methods and computer program products according to various embodiments of the present invention. In this regard, each block in the flowchart may represent a unit, segment, or portion of code, which comprises one or more executable instructions for implementing the specified logical function(s). It should also be noted that, in some alternative implementations, the functions noted in the blocks might occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Many of the functional units described in this specification have been labeled as "units" in order to more particularly emphasize their implementation independence. For example, a unit may be implemented as a hardware circuit comprising custom VLSI circuits or gate arrays, off-the-shelf semiconductors such as logic chips, transistors, or other discrete components. A unit may also be implemented in programmable hardware devices such as field programmable gate arrays, programmable array logic, programmable logic devices or the like. Units may also be implemented in software for execution by various types of processors. An identified unit or component of executable code may, for instance, comprise one or more physical or logical blocks of computer instructions which may, for instance, be organized as an object, procedure, or function. Nevertheless, the executables of an identified unit need not be physically located together, but may comprise disparate instructions stored in different locations which, when joined logically together, comprise the unit and achieve the stated purpose for the unit.

Further, a unit of executable code could be a single instruction, or many instructions, and may even be distributed over several different code segments, among different programs, and across several memory devices. Similarly, operational data may be identified and illustrated herein within units, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, units may also be implemented as a combination of software and one or more hardware devices. For instance, a unit may be embodied in the combination of a software executable code stored on a memory device. In a further example, a unit may be the combination of a processor that operates on a set of operational data. Still further, a unit may be implemented in the combination of an electronic signal communicated via transmission circuitry.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

For example, an implementation of exemplary computer system may be stored on or transmitted across some form of computer readable storage medium. Computer readable storage medium can be any available media that can be accessed by a computer. By way of example, and not limitation, computer readable storage medium may comprise "computer storage media" and "communications media."

"Computer-readable storage device" includes volatile and non-volatile, removable and non-removable computer storable media implemented in any method or technology for storage of information such as computer readable instructions, data structures, program units, or other data. Computer storage device includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

That is, the aforementioned detailed description of the present disclosure describes examples that are applied to an intelligent control system using a network camera. However, the present disclosure may also be applicable to other control systems using a similar technical background and a similar network camera without departing from the scope and the spirit of the present disclosure, which may be implemented based on determination of those skilled in the art.

What is claimed is:

1. An intelligent control system, comprising:
    a plurality of network cameras to monitor a surveillance area;
    at least one memory; and
    program instructions stored in the memory that cause the system to:
        perform, by a plurality of image gates, image processing of image data, which is input from the plurality of network cameras, according to a specification that is requested by a user, where in the specification comprises a viewpoint of the user;
        adjust a resolution of the image data based on the viewpoint of the user;
        convert a plurality of image streams associated with the requesting user to a single image stream via image processing; and
        generate a three-dimensional (3D) image by segmenting the single image stream into a plurality of images based on an image resolution and a frame size, and by disposing the segmented images on corresponding positions on a 3D modeling;
    wherein each of the plurality of image gates includes a plurality of image processors, each of the image processors comprising:
        a decoder configured to decode image data that is input in real time from the plurality of network cameras;
        a plurality of processors configured to perform image processing of the image data, which is decoded by the decoder, according to the specification that is requested by the user;
        a plurality of encoders configured to encode data that is image processed by the plurality of processors; and
        a plurality of streamers configured to perform image streaming of the data that is encoded by the plurality of encoders.

2. The system of claim 1, the program instructions further causing the system to:
    provide a plurality of users, present in a network, with the plurality of image streams.

3. The system of claim 1, the program instructions further causing the system to:
    provide a senior supervisor, present in the network, with a final screen.

4. The system of claim 1, the plurality of image gates configured to process image data that is input from a predetermined network camera group among the plurality of network cameras.

5. The system of claim 4, wherein the plurality of image processors are connected one-to-one with cameras belonging to the network camera group, respectively.

6. The system of claim 1, the program instructions further causing the system to:
    generate image segmentation information for disposing image data as different sizes of images on a single screen.

7. The system of claim 6, the program instructions further causing the system to dispose the image data as the different sizes of images according to resolutions of the image data.

8. The system of claim 1, further comprising:
    a plurality of decoders configured to decode image data that is input from the image gate; and
    a plurality of encoders configured to provide a multi-streaming service by encoding and streaming a plurality of images that are decoded by the plurality of decoders.

9. The system of claim 1, further comprising:
    a plurality of image displays configured to display the plurality of images on different screens in response to a request of the user.

10. The system of claim 9, wherein each of the plurality of image displays comprises:
    program instructions causing the display to segment a single image stream into a plurality of images for configuring a single screen;
    a 3D model generator configured to model the surveillance area to a 3D image; and
    a rendering processor configured to generate a 3D image by disposing the images on corresponding positions of the 3D modeling.

11. The system of claim 10, wherein each of the image displays further comprises:
    a decoder configured to decode the single image stream and to provide the decoded image stream for image segmentation; and
    a display configured to display the 3D image that is generated by the rendering processor.

12. The system of claim 1, the program instructions further causing the system to:
    calculate resolutions of a plurality of images to be included in a corresponding screen by analyzing the screen; and
    provide the calculated resolutions to an image gate.

13. The system of claim 9, further comprising:
    a plurality of encoders configured to encode a screen, output in real time, configured to provide the senior supervisor with a finally output screen, and to perform multi-streaming of the encoded screen.

14. The system of claim 1, wherein the image data is encoded and decoded using H.264 or MPEG 4.

15. An intelligent control method, comprising the computer implemented steps of:
    receiving, from a plurality of network cameras, image data in which a surveillance area is monitored;
    performing image processing with a plurality of image gates, wherein each of the plurality of image gates includes a plurality of image processors, of the received image data according to a specification that is requested by a user, where in the specification comprises a viewpoint of the user;
    adjusting a resolution of the image data based on the viewpoint of the user;
    converting the plurality of image processed image data to a single image stream to be displayed on a single screen wherein the plurality of image processed image data is associated with the requesting user; and
    generating a 3D image by segmenting the converted single image stream into a plurality of images based on an image resolution and a frame size, and by disposing the segmented images on corresponding positions of a 3D modeling,
    wherein each of the image processors comprises:
        a decoder configured to decode image data that is input in real time from the plurality of network cameras;
        a plurality of processors configured to perform image processing of the image data, which is decoded by a decoder, according to the specification that is requested by the user;
        a plurality of encoders configured to encode data that is image processed by the plurality of processors; and
        a plurality of streamers configured to perform image streaming of the data that is encoded by the plurality of encoders.

16. The method of claim 15, further comprising the computer implemented steps of:
    providing a plurality of users, present in a network, with the plurality of image processed image streams; and
    providing a senior supervisor, present in the network, with the generated 3D image.

17. The method of claim 15, wherein the performing of the image processing comprises the computer implemented steps of:
    decoding the received image data;
    performing image processing of the decoded image data according to the specification that is requested by the user; and
    encoding the image processed data and performing image streaming of the encoded data.

18. The method of claim 15, wherein the converting comprises the computer implemented steps of:
    decoding the plurality of image processed image data;
    generating image segmentation information for disposing the plurality of decoded images as different sizes of images on a single screen; and
    encoding the plurality of decoded images to convert the plurality of encoded images to a single image stream.

19. The method of claim 15, wherein the generating comprises the computer implemented steps of:
    segmenting the converted single image stream into a plurality of images for configuring a single screen;
    modeling the surveillance area to a 3D image; and
    generating the 3D image by disposing the plurality of segmented images on corresponding positions of the 3D modeling.

* * * * *